United States Patent [19]
Nishida et al.

[11] 3,939,950
[45] Feb. 24, 1976

[54] FLUID OPERATED BRAKES AND REVERSING CLUTCHES FOR WINCH DRUMS

[75] Inventors: Kazumori Nishida; Toshinori Kawahashi, both of Hirakata; Yoshimasa Tanaka, Kyoto, all of Japan

[73] Assignee: Kabushiki Kaisha Komatsu Seisakasho, Japan

[22] Filed: Mar. 5, 1974

[21] Appl. No.: 448,239

[30] Foreign Application Priority Data
Mar. 5, 1973    Japan............................ 48-25152

[52] U.S. Cl............. 192/4 R; 192/12 C; 192/87.18; 74/471 XY; 74/360; 254/185 B; 251/296
[51] Int. Cl.².................... F16D 67/04; B66D 1/26
[58] Field of Search...... 192/4 R, 12 C, 18 A, 17 A; 254/185 B

[56] References Cited
UNITED STATES PATENTS

| | | | |
|---|---|---|---|
| 2,947,397 | 8/1960 | Pietsch......................... | 192/17 A X |
| 2,966,752 | 1/1961 | Wampach..................... | 192/17 A X |
| 3,128,861 | 4/1964 | Trondseu...................... | 192/17 A X |
| 3,529,705 | 9/1970 | Cudnohufsky................. | 192/4 R X |
| 3,651,905 | 3/1972 | Brown............................. | 192/4 R X |

*Primary Examiner*—Benjamin W. Wyche
*Attorney, Agent, or Firm*—Armstrong, Nikaido & Wegner

[57] ABSTRACT

An operating device for a double drum winch that has a hydraulically operated clutch, a brake and a hydraulic pressure variable control valve, and a single control lever connected to the hydraulic pressure variable control vavle to enable the operation of a hook and boom by one control lever so as to simplify the function and uses of the winch.

4 Claims, 7 Drawing Figures

3,939,950

FLUID OPERATED BRAKES AND REVERSING CLUTCHES FOR WINCH DRUMS

BACKGROUND OF THE INVENTION

This invention relates to a crane, and more particularly to an operating mechanism for a double drum winch which is used in a crane, which may be mounted to one side of a vehicle.

In the operating mechanism of a winch of this type, heretofore, the clutch and brake are directly manually operated, thereby requiring a large operating force. Additionally in the prior art mechanism, the engagement and disengagement of the clutch and brake are conducted by starting or stopping the supply of hydraulic pressure. It is impossible, therefore, to start, stop and inch the winch smoothly.

In accordance with an object of the present invention, there is provided an operating mechanism for a double drum winch which eliminates the aforementioned disadvantages of the conventional device and which simplifies the operation of the mechanism. The mechanism of the present invention additionally allows a smooth inching operation.

The mechanism provided by the present invention also is capable of eliminating any time lag in the operation of the winch.

It is another object of the present invention to provide an operating device for a double drum winch that will easily permit minute and finite operation of the device which is both smooth and precise.

It is still another object of the present invention to provide an operating device for a double drum winch that will eliminate the time lag in operation experienced with previous conventional structures.

SUMMARY OF THE INVENTION

In accordance with the present invention, a device in the form of an operating mechanism for a double drum winch, including a prime mover for transmitting power to universal joints, right and left, low and high speed clutches, a plurality of rotary clutches, shafts and gears with brakes designed to operate a hook and boom wherein the clutches, brakes and gears are integrally connected and whereby these devices are controlled by circuits, regular valves and control valves such that the fluid operation of the mechanism occurs through a lever designed to operate the control valves such that fluid is released in a predetermined fashion to the clutches and brakes which combined to produce hoisting, lowering and suspending of the hook and boom, all designed to produce a smooth and easy function and use of the mechanism in a winch system so as to permit, among other things, precision operation.

BRIEF DESCRIPTION OF THE DRAWING

The invention is described further, by way of illustration, with reference to the accompanying drawings, in which like reference numerals and characters designate corresponding parts and components and in which.

DETAILED DESCRIPTION OF THE DRAWINGS

Figure 1:
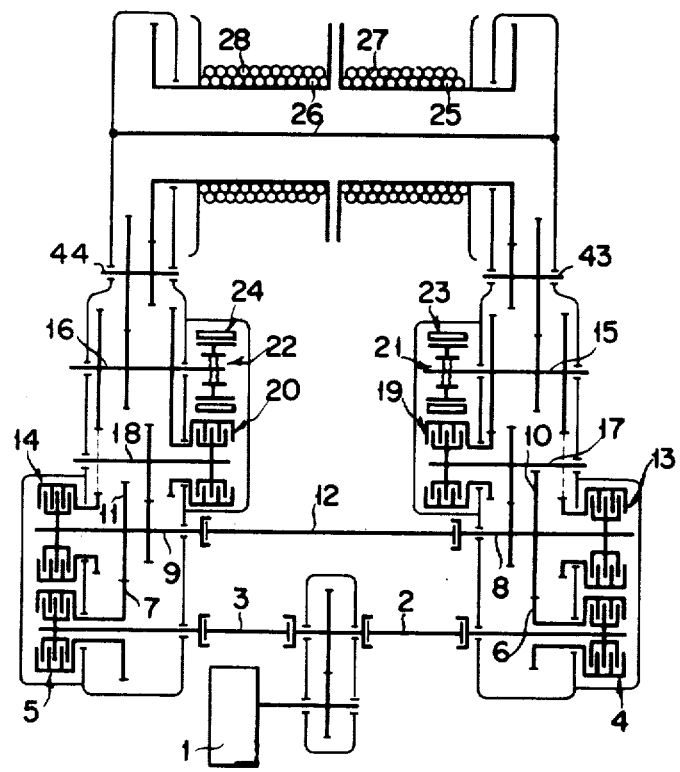
FIG. 1 is a schematic view of the power transmission line of one embodiment of the double drum winch used with the operating mechanism of the present invention.

Referring now to the drawings, and particularly to FIG. 1, power from a prime mover 1 is transmitted through right and left universal joints 2 and 3 to right low speed clutch 4 and left high speed clutch 5, respectively. Gears 6 and 7 of the low and high speed clutches 4 and 5, respectively, are engaged with gears 10 and 11 of first clutch shafts 8 and 9, of the hook and boom sides, respectively, of the winch. The first clutch shafts 8 and 9 are integrally connected by a universal joint shaft 12. Rotary clutch 13 for hoisting and dropping the hook is provided on the first clutch shaft 8, and rotary clutch 14 for swinging upward and downward the boom is provided on the first clutch shaft 9. The driven sides of the clutches 13 and 14 are connected through suitable transmission mechanisms to brake shafts 15 and 16, respectively. The first clutch shafts 8 and 9 are connected by suitable transmission mechanisms to second clutch shafts 17 and 18, respectively. Rotary clutches 19 and 20 for operating the hook and boom, respectively, are provided on the second clutch shafts 17 and 18, respectively. The driven sides of the clutches 19 and 20 are connected to the brake shafts 15 and 16, respectively, through suitable transmission mechanisms. Brakes 23 and 24 are operatively connected to the brake shafts 15 and 16, respectively, through one-way clutches 21 and 22, respectively. The one-way clutches 21 and 22 are operated so that the rotation of the second clutch shafts 17 and 18 is transmitted to the brake side only in the rotating direction when the power is transmitted by way of the first clutch shafts 8 and/or 9. The brake shafts 15 and 16 are connected through intermediate shafts 43 and 44 to hook and boom drums 25 and 26, respectively, by the interposition of gears mounted on the brake shafts 15 and 16 and the intermediate shafts 42 and 43. Wire ropes 27 and 28 are wound on the drums 25 and 26, respectively.

In the above construction, the brakes 23 and 24 are normally biased into engagement by the action of spring means and are disengaged hydraulically, and the rotary clutches 13, 14, and 19. 20 and high and low speed clutches 4 and 5 are engaged hydraulically and are disengaged by the biasing action of spring means so that in the absence of hydraulic actuation there is no rotation of the hook and boom drums 25 and 26, whereas upon hydraulic actuation of the appropriate high or low speed clutch, rotary clutches and drum brake, the hook or boom drum may be rotated for hoisting or dropping the hook and for swinging upward or downward the boom.

Figure 2:
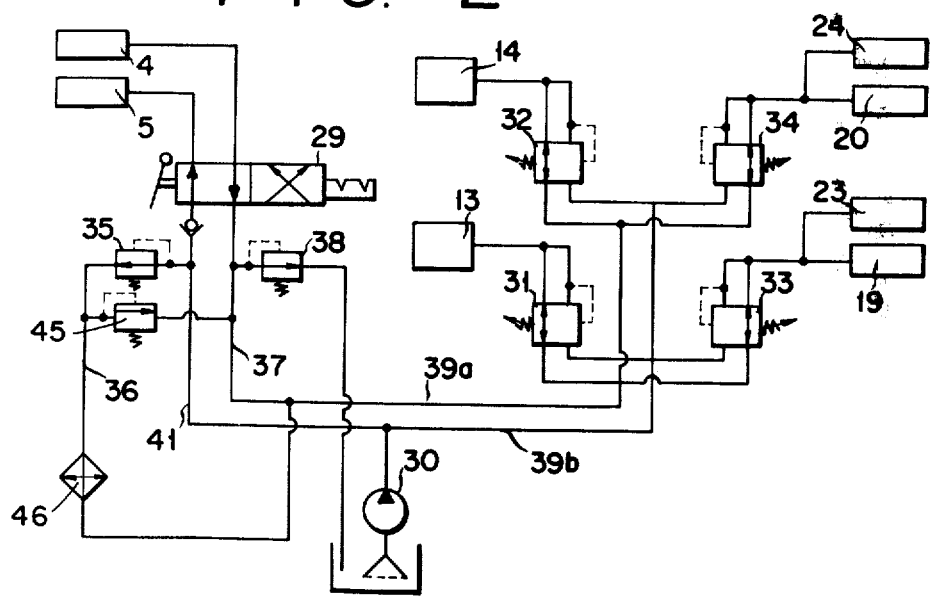
FIG. 2 is a hydraulic circuit diagram of the operating device for a winch according to the present invention.

The operating mechanism for the brakes and clutches is shown in FIG. 2. The low and high speed clutches 4 and 5 are connected through a speed selecting control valve 29 and a hydraulic oil supply circuit 39b to a pump 30 connected to a source of hydraulic pressure. The rotary clutches 13, 14 and 19, 20 are hydraulically connected through the hydraulic oil supply circuit 39b and speed selecting control valve 29 to one of the speed clutches, for example, the high speed clutch 5 so as to engage the clutch 5. The hydraulic pressure at this time is maintained constant by a pressure regulator valve 35. The oil relieved from the pressure regulator valve 35 is supplied from a relief circuit 36 to a return circuit 37, and the hydraulic oil in the circuit 37, of a pressure controlled by a regulator valve 38, is supplied through the control valve 29 to the low speed clutch 4 which is not operated. On the other hand, the rotary clutches 13, 14, 19 and 20 are hydraulically connected through a return circuit 39a to the circuit 37. Reference numerals 31 to 34 represent hydraulically operated variable control valves which are provided between the circuits 39a and 39b in the vicinity of the rotary clutches 13, 14, 19 and 20, respectively, so that respective hydraulic pressure of the rotary clutches 13, 14, 19 and 20 are automatically maintained to a predetermined value. And, the hydraulic oil in the circuit 37 is also supplied through the circuit 39a and the control valves 31 to 34 to the rotary clutches 13, 14, 19 and 20 and to operating chambers of the brakes 23 and 24 when both the boom and hook are not operated.

Figure 3:
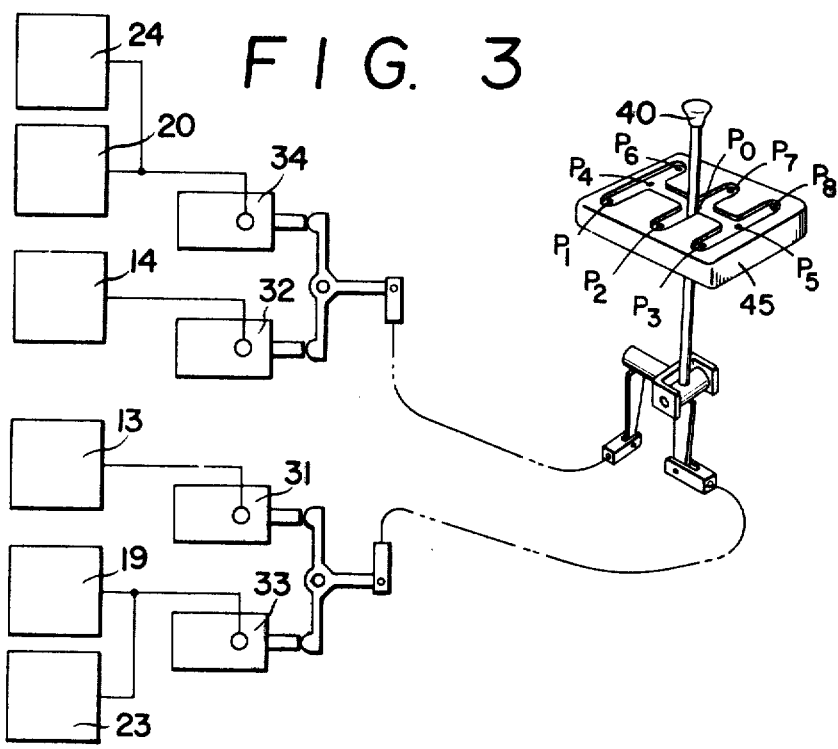
FIG. 3 is a view of one embodiment of an actuation system of the operating mechanism of the winch of the invention when the operating mechanism of the invention is connected to a single actuating lever in neutral position.

The relationship between the hydraulically operated variable control valves 31 to 34 and the lever 40 is shown in FIG. 3, and these control valves 31 to 34 are operated by the operation of only the lever 40 individually or simultaneously in plurality.

As shown in FIG. 3, the lever 40 can select in cooperation with a guide plate 45 nine positions which comprise a first position $P_0$ which is the neutral position, that is, where both the hook and boom are simultaneously suspended; a second position $P_1$ where the hook is dropped while the boom is swung upward; a third position $P_2$ where the hook is dropped while the boom is suspended; and fourth position $P_3$ where the hook is hoisted and the boom is swung upward; a fifth position $P_4$ where the hook is dropped while the boom is suspended; a sixth position $P_5$ where the hook is hoisted while the boom is suspended; a seventh position $P_6$ where the hook is dropped and the boom is swung downward; an eighth position $P_7$ where the hook is suspended while the boom is swung downward; and a ninth position $P_8$ where the hook is hoisted while the boom is swung downward.

Operation of the operating device of the present invention thus constrtcted will now be described in the following.

When one or a plurality of the hydraulically operated variable control valves 31 to 34 are actuated by the operation of the lever 40, the pressure of the hydraulic oil from the pump 30 causes engagement of either one of the high and low speed clutches 4 and 5 selected by the operation of the speed control valve 29. At that time, the hydraulic pressure in the speed clutch is maintained constant by the action of the regulator valve 35. There is simultaneous engagement of the rotary clutch 13 or 19 for hoisting or dropping the hook, respectively, or the rotary clutch 14 or 20 for swinging up- or down-ward the boom, respectively, caused by hydraulic pressure supplied through the circuit 39b and said one or plurality of variable control valves 31 to 34 from the pump 30.

Figure 4:
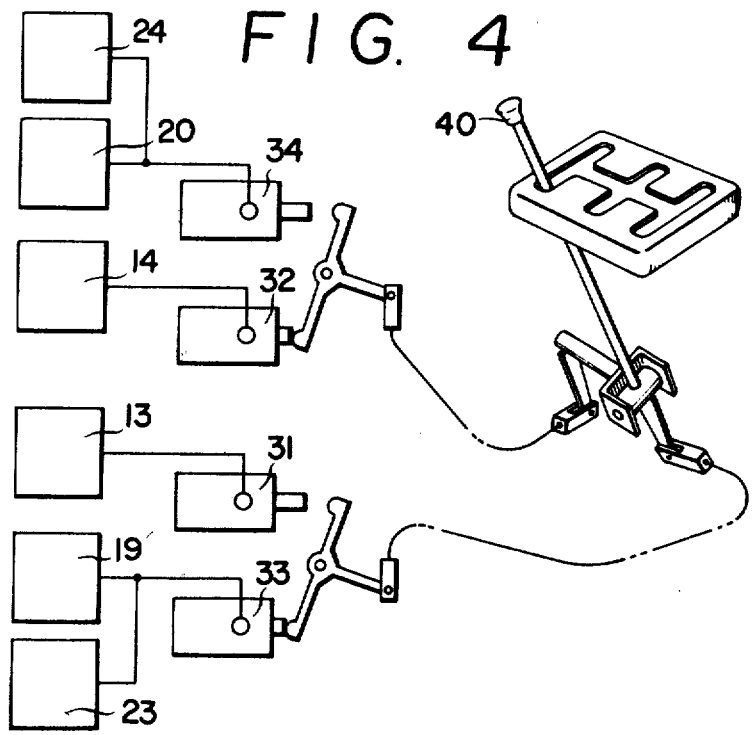
FIG. 4 is a view similar to FIG. 3, but showing the actuating lever in an operating position.

For example, as shown in FIG. 4, when the lever 40 is located in the second position $P_1$, the variable control valves 32 and 33 are actuated so that engagement of the rotary clutch 14 for swinging upward the boom and that of the rotary clutch 19 for dropping the hook are caused.

Figure 5:
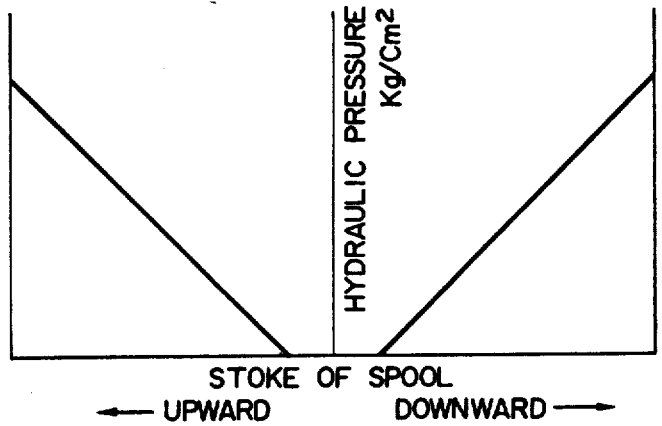
FIG. 5 is a graph of the operating characteristics of a hydraulically operated variable valve used in the mechanism of the invention.
Figure 6:
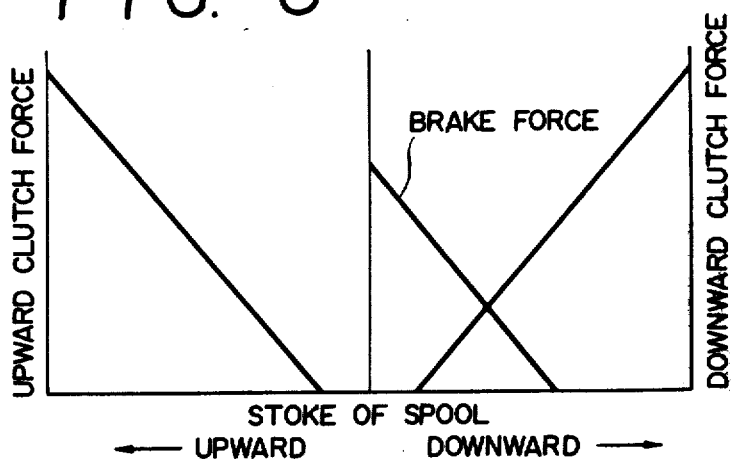
FIG. 6 is a graph of the relationship between the clutch force and the brake force of the mechanism.

The variable control valves 31, 32 and 33, 34 also tend to balance the hydraulic pressure with the respective tension of the springs contained in the respective spools thereof, and thereby engage gradually the respective clutches 13, 14 and 19, 20 as the hydraulic oil pressure increases. The brakes 23 and 24 operate similarly. The relationship between the displaced length of the spool of the control valves and the generated hydraulic pressure is shown in FIG. 5, and the relationship between the operating forces of the rotary clutch 19 for operating the hook and of the hook brake 23 is shown in FIG. 6.

This construction results in smooth operation of the hook and boom, allowing inching movement of the hook.

Though the embodiment shown in FIGS. 3 and 4 is operated by a single lever 40, the device of the present invention may also be operated by two independent levers for the hook and the boom, if desired, within the scope of the present invention.

Figure 7:
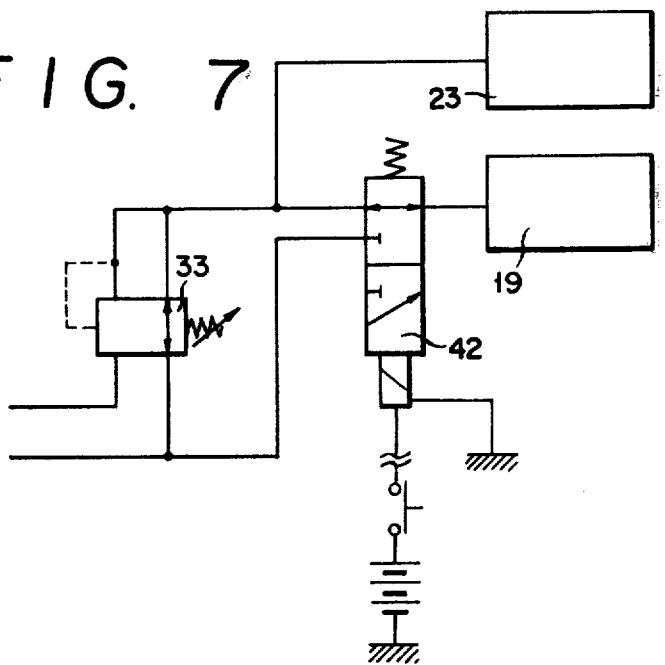
FIG. 7 is a hydraulic circuit diagram of another embodiment of the mechanism of the invention.

Further, as shown in FIG. 7, disengagement of the brake 23 of the hook only may be achieved by providing a solenoid valve 42 in the circuit of the rotary clutch 19 for dropping the hook. This results in a hook free fall which has a variety of uses.

It will be understood from the foregoing description that the operation of the hook and boom can be operated through the hydraulically operated variable control valve by one operating lever, operated with light operating force, and it may simplify the operation of the mechanism. Further, it should also be understood that the supply pressure of the hydraulic oil to the rotary clutches 13, 14 and 19, 20 for operating the hook and boom, respectively, is gradually increased by the action of the hydraulically operated variable control valve so as to smoothly operate the hook and boom to facilitate easy inching operation. Since the side not operated of the respective clutches is always supplied with hydraulic oil relieved from the pressure regulator valve 35, the time lag at the starting operation which often occurs in prior art devices is eliminated.

What is claimed is:

1. An operating mechanism for a double-drum winch which comprises:
   a. a pump for pumping hydraulic oil from a source thereof into a hydraulic oil supply circuit of the mechanism,
   b. low and high speed clutches capable of being hydraulically engaged to transmit power from a power source and being disengaged by the action of spring means provided respectively therein,
   c. a speed selecting control valve situated between said hydraulic oil supply circuit and a return circuit of said hydraulic oil and capable of selectively permitting hydraulic communication between one of said low and high speed clutches and said pump,
   d. a hook hoisting rotary clutch connected to said low and high speed clutches and capable of being hydraulically engaged to hoist the hook and being disengaged by the action of spring means provided therein,
   e. a hook dropping rotary clutch connected to said low and high speed clutches and capable of being hydraulically engaged to drop the hook and being disengaged by the action of spring means provided therein, f. a boom upward swinging rotary clutch connected to said low and high speed clutches and capable of being hydraulically engaged to swing the boom upward and being disengaged by the action of spring means provided therein, g. a boom downward swinging rotary clutch connected to said low and high speed clutches and capable of being hydraulically engaged to swing the boom downward and being disengaged by the action of spring means provided therein, h. a hook brake having a brake shaft and connected through a one-way clutch to said hook dropping rotary clutch, i. a boom brake having a brake shaft and connected through a one-way clutch to said boom downward swinging rotary clutch, j. hydraulically operated variable control valves situated between said hydraulic oil supply circuit and said return circuit in the vicinity of the respective rotary clutch and capable of selectively permitting hydraulic communication between said respective rotary clutch and said pump, k. a relief circuit situated between said hydraulic oil supply circuit and said return circuit, both the circuits being located between said speed selecting control valve and said pump, and provided therein with a pressure regulator valve to maintain the hydraulic oil pressure supplied into one of said low and high speed clutches at a predetermined constant value, wherein said low and high speed clutches and said rotary clutches are permitted to hydraulically communicate with said return circuit respectively through said speed selecting control valve and said hydraulically operated variable control valves when said clutches are not operated.

2. The mechanism of claim 1, further comprising a solenoid valve situated between said hydraulic oil supply circuit and said return circuit in the vicinity of said hook dropping rotary clutch so that when the solenoid of said solenoid valve is actuated said hook brake is independently released so as to cause the hook to free fall.

3. The mechanism of claim 1, wherein said hydraulically operated variable control valves are connected to a single operating lever capable of selecting nine positions comprising a first position wherein the neutral position in which both the hook and boom are simultaneously suspended, a second position where the hook is dropped while the boom is swung upward, a third position where the hook is dropped while the boom is suspended, a fourth position where the hook is hoisted and the boom is swung upward, a fifth position where the hook is dropped while the boom is suspended, a sixth position where the hook is hoisted while the boom is suspended, a seventh position where the hook is dropped and the boom is swung downward, an eighth position where the hook is suspended while the boom is swung downward, and a ninth position where the hook is hoisted while the boom is swung downward.

4. The mechanism of claim 1, wherein said hydraulically operated variable control valves are connected to two operating levers, each of which is capable of selecting the neutral position, a first operable position and a second operable position, one of said operating levers being used for operating the boom and the other being used for operating the hook.

* * * * *